US009636894B2

(12) United States Patent
Lu

(10) Patent No.: US 9,636,894 B2
(45) Date of Patent: *May 2, 2017

(54) POLYMER INTERLAYERS COMPRISING A BLEND OF TWO OR MORE RESINS

(71) Applicant: SOLUTIA INC., St. Louis, MO (US)

(72) Inventor: Jun Lu, East Longmeadow, MA (US)

(73) Assignee: Solutia Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/973,547

(22) Filed: Dec. 17, 2015

(65) Prior Publication Data

US 2016/0102181 A1    Apr. 14, 2016

Related U.S. Application Data

(63) Continuation of application No. 14/300,612, filed on Jun. 10, 2014, now Pat. No. 9,248,626.

(60) Provisional application No. 61/833,205, filed on Jun. 10, 2013.

(51) Int. Cl.

| | |
|---|---|
| *C08J 5/18* | (2006.01) |
| *B32B 27/22* | (2006.01) |
| *B32B 7/02* | (2006.01) |
| *B32B 27/08* | (2006.01) |
| *B32B 27/30* | (2006.01) |
| *C08L 29/14* | (2006.01) |
| *C08K 5/00* | (2006.01) |
| *C08L 29/04* | (2006.01) |
| *C08K 5/11* | (2006.01) |
| *C08K 5/12* | (2006.01) |
| *C08K 5/13* | (2006.01) |
| *B32B 17/10* | (2006.01) |

(52) U.S. Cl.
CPC ............... *B32B 27/22* (2013.01); *B32B 7/02* (2013.01); *B32B 17/10036* (2013.01); *B32B 17/1055* (2013.01); *B32B 17/10605* (2013.01); *B32B 17/10761* (2013.01); *B32B 27/08* (2013.01); *B32B 27/30* (2013.01); *B32B 27/306* (2013.01); *C08J 5/18* (2013.01); *C08K 5/0016* (2013.01); *C08K 5/11* (2013.01); *C08K 5/12* (2013.01); *C08K 5/13* (2013.01); *C08L 29/04* (2013.01); *C08L 29/14* (2013.01); *B32B 2250/02* (2013.01); *B32B 2250/03* (2013.01); *B32B 2250/246* (2013.01); *B32B 2307/412* (2013.01); *B32B 2307/418* (2013.01); *B32B 2307/546* (2013.01); *B32B 2307/558* (2013.01); *B32B 2307/56* (2013.01); *B32B 2329/06* (2013.01); *B32B 2419/00* (2013.01); *B32B 2457/12* (2013.01); *B32B 2605/08* (2013.01); *B32B 2605/18* (2013.01); *C08J 2329/14* (2013.01); *C08L 2205/02* (2013.01); *C08L 2205/025* (2013.01); *Y10T 428/24983* (2015.01)

(58) Field of Classification Search
CPC .......... B32B 17/10036; B32B 17/1055; B32B 17/10605; B32B 17/10761; B32B 2250/02; B32B 2250/03; B32B 2250/246; B32B 2307/56; B32B 2307/412; B32B 2307/418; B32B 2307/546; B32B 2307/558; B32B 2329/06; B32B 2419/00; B32B 2457/12; B32B 2605/08; B32B 2605/18; B32B 27/02; B32B 27/08; B32B 27/22; B32B 27/30; B32B 27/306; B32B 7/02; C08J 2329/14; C08J 5/18; C08K 5/11; C08K 5/12; C08K 5/13; C08L 2205/02; C08L 2205/025; C08L 29/04; C08L 29/14

See application file for complete search history.

(56) References Cited

U.S. PATENT DOCUMENTS

| | | | |
|---|---|---|---|
| 2,282,026 A | 5/1942 | Bozetech Bren et al. | |
| 2,282,057 A | 5/1942 | Hopkins et al. | |
| 2,456,366 A | 12/1948 | Bren et al. | |
| 3,644,594 A | 2/1972 | Mont | |
| 4,361,625 A | 11/1982 | Beckmann et al. | |
| 4,584,229 A | 4/1986 | Bourelier et al. | |
| 4,874,814 A | 10/1989 | Cartier | |
| 5,169,897 A | 12/1992 | Walls | |
| 5,190,826 A * | 3/1993 | Asahina ............ | B32B 17/10009 181/176 |
| 5,290,660 A | 3/1994 | Eian et al. | |
| 5,340,654 A | 8/1994 | Ueda et al. | |
| 5,409,734 A | 4/1995 | Lee et al. | |
| 5,593,786 A | 1/1997 | Parker et al. | |
| 5,728,472 A | 3/1998 | D'Errico | |
| 6,372,352 B1 | 4/2002 | Bletsos et al. | |

(Continued)

FOREIGN PATENT DOCUMENTS

| | | |
|---|---|---|
| DE | 10343385 A1 | 4/2005 |
| DE | 102008001512 A1 | 11/2009 |

(Continued)

OTHER PUBLICATIONS http://www.chemicalbook.com/ChemicalProductProperty_EN_CB0225180.htm; Jul. 2011.
Dupont, Untitled [discloses comparisons between PVB and SGP interlayers used in safety glass], accessed on Sep. 12, 2016, Dupont. com, obtained from http://www2.dupont.com/Building_Innovations/zh_CN/assets/downloads/SGPintro_E.pdf.
PubChem, Glutaraldehyde, accessed on Sep. 12, 2016, NIH.gov, obtained from https://pubchem.ncbi.nlm.nih.gov/compound/glotaraldehyde#section=Top.

(Continued)

*Primary Examiner* — Satya Sastri
(74) *Attorney, Agent, or Firm* — Michelle Bugbee

(57) ABSTRACT

An interlayer comprised of a blend of thermoplastic resins and at least one high refractive index having improved acoustic and optical quality is disclosed. The use of a blend thermoplastic resins and a high refractive index plasticizer improves transparency and acoustic properties without sacrificing other characteristics of the interlayer.

19 Claims, No Drawings

(56) References Cited

U.S. PATENT DOCUMENTS

| | | | |
|---|---|---|---|
| 6,984,679 B2* | 1/2006 | Papenfuhs | B32B 17/10761 524/284 |
| 7,121,380 B2 | 10/2006 | Garnier et al. | |
| 7,452,608 B2 | 11/2008 | Fukatani et al. | |
| 7,510,771 B2 | 3/2009 | Lu | |
| 7,854,993 B2 | 12/2010 | Lu | |
| 7,883,761 B2 | 2/2011 | Bourcier et al. | |
| 8,470,908 B2 | 6/2013 | Frank | |
| 8,597,792 B2 | 12/2013 | Meise et al. | |
| 8,715,815 B2 | 5/2014 | Shimamoto | |
| 8,741,439 B2 | 6/2014 | Shimamoto et al. | |
| 8,920,930 B2 | 12/2014 | Meise et al. | |
| 9,114,595 B2 | 8/2015 | Bourcier et al. | |
| 9,238,354 B2 | 1/2016 | Iwamoto | |
| 9,248,626 B2* | 2/2016 | Lu | B32B 7/02 |
| 2003/0139520 A1 | 7/2003 | Toyama | |
| 2004/0065229 A1 | 4/2004 | Papenfuhs et al. | |
| 2004/0219365 A1 | 11/2004 | Yuan | |
| 2005/0142332 A1 | 6/2005 | Sauer | |
| 2006/0210776 A1 | 9/2006 | Lu et al. | |
| 2007/0036956 A1 | 2/2007 | Chen et al. | |
| 2007/0122629 A1 | 5/2007 | Chen et al. | |
| 2007/0148472 A1 | 6/2007 | Masaki et al. | |
| 2007/0248809 A1 | 10/2007 | Haldeman et al. | |
| 2007/0289693 A1 | 12/2007 | Anderson et al. | |
| 2008/0268270 A1 | 10/2008 | Chen et al. | |
| 2008/0280076 A1 | 11/2008 | Hayes et al. | |
| 2008/0286542 A1 | 11/2008 | Hayes et al. | |
| 2009/0226750 A1 | 9/2009 | Lu | |
| 2009/0293952 A1 | 12/2009 | Koran et al. | |
| 2010/0028642 A1 | 2/2010 | Steuer et al. | |
| 2010/0040868 A1 | 2/2010 | Fukatani et al. | |
| 2010/0124647 A1 | 5/2010 | Keller et al. | |
| 2012/0133764 A1 | 5/2012 | Hurlbut | |
| 2012/0263958 A1 | 10/2012 | Iwamoto et al. | |
| 2013/0022824 A1 | 1/2013 | Meise et al. | |
| 2013/0022825 A1 | 1/2013 | Meise et al. | |
| 2013/0157065 A1 | 6/2013 | Shimamoto et al. | |
| 2013/0189527 A1 | 7/2013 | Meise et al. | |
| 2013/0236693 A1 | 9/2013 | Lu | |
| 2013/0236711 A1 | 9/2013 | Lu | |
| 2013/0274396 A1 | 10/2013 | Arendt et al. | |
| 2013/0323516 A1 | 12/2013 | Shimamoto et al. | |
| 2014/0000977 A1 | 1/2014 | Matsuda et al. | |
| 2015/0158276 A1 | 6/2015 | Thompson et al. | |
| 2016/0046783 A1 | 2/2016 | Asanuma | |

FOREIGN PATENT DOCUMENTS

| | | |
|---|---|---|
| JP | 05-104687 A | 4/1993 |
| JP | 05-310449 A | 11/1993 |
| JP | 09-156967 A | 6/1997 |
| WO | WO 2010/108975 A1 | 9/2010 |
| WO | WO 2012/092366 | 7/2012 |

OTHER PUBLICATIONS

Sigma-Aldrich, Tri(ethylene glycol) bis(2-ethylhexanoate), accessed on Sep. 12, 2016, Sigmaaldrich.com, obtained from http://www.sigmaaldrich.com/catalog/product/aldrich/525103?lang-en®ion=US.

AzoM, Indium Tin Oxide (ITO)—Properties and Applications, Jan. 23, 2004, Azo Materials, obtained from http://www.azom.com/article.aspx?ArticleID=2349.

Sigma-Aldrich "Di(propylene glycol) dibenzoate" retrieved Jul. 1, 2016, 3 pages.

"Aerosil MOX 170 MSDS"; Evonik Industries, Jun. 25, 2016; pp. 1-12.

Office Action dated Oct. 4, 2016 received in co-pending U.S. Appl. No. 14/299,945.

Office Action dated Aug. 22, 2016 received in co-pending U.S. Appl. No. 14/563,347.

Office Action dated Aug. 12, 2016 received in co-pending U.S. Appl. No. 14/563,364.

Office Communication received in co-pending U.S. Appl. No. 14/563,372 notification date Aug. 3, 2016.

Copending U.S. Appl. No. 15/246,810, filed Aug. 25, 2016; Jun Lu et al.

Notice of Allowance and Fee(s) Due dated Aug. 12, 2016 received in co-pending U.S. Appl. No. 15/051,222.

Copending U.S. Appl. No. 15/248,502, filed Aug. 26, 2016; Jun Lu.

Office Action dated Oct. 6, 2016 received in co-pending U.S. Appl. No. 14/563,378.

Office Action dated Sep. 16, 2016 received in co-pending U.S. Appl. No. 14/563,011.

Office Communication notification date Jul. 11, 2016 received in U.S. Appl. No. 14/587,702.

ChemicalBook, Triethylene glycol bis(2-ethylhexanoate), Access Jul. 13, 2015 by Examiner, First Page.

Ellis, Bryan and Ray Smith. "Polymers—A Property Database (2nd Edition)", Dec. 2009, Taylor & Francis, $2^{nd}$ Edition, p. 573.

Sigma-Aldrich®. "Poly(3-methyl-1,5-pentanediol Adipate)," Retrieved Apr. 11 2016, p. 1.

Wade, B.E., Vinyl Acetal Polymers, in Encyclopedia of Polymer Science & Technology, 3rd edition, vol. 8, pp. 381-399, (2003).

Copending U.S. Appl. No. 14/299,945, filed Jun. 9, 2014, Jun Lu, et al.; now U.S. Publication No. 2014-0363651.

Office Action dated Jul. 8, 2015 received in co-pending U.S. Appl. No. 14/299,945.

Office Action dated Dec. 3, 2015 received in co-pending U.S. Appl. No. 14/299,945.

Copending application U.S. Appl. No. 14/300,612, filed Jun. 10, 2014, Jun Lu; now U.S. Pat. No. 9,248,626.

Office Action dated Apr. 6, 2015 received in co-pending U.S. Appl. No. 14/300,612.

Office Action dated Aug. 5, 2015 received in co-pending U.S. Appl. No. 14/300,612.

USPTO Notice of Allowance dated Nov. 20, 2015 for copending U.S. Appl. No. 14/300,612.

Copending U.S. Appl. No. 14/299,975, filed Jun. 9, 2014, Jun Lu, et al.; now U. S. Publication No. 2014/0363652.

Office Action dated Jul. 6, 2015 received in U.S. Appl. No. 14/299,975.

Office Action dated Nov. 30, 2015 received in co-pending U.S. Appl. No. 14/299,975.

Copending application U.S. Appl. No. 14/299,996, filed Jun. 9, 2014, Jun Lu, et al.; now U.S. Pat. No. 9,254,625.

Copending application U.S. Appl. No. 14/973,500, filed Dec. 17, 2015, Lu et al.; now U. S. Publication No. 2016/0101605.

Co-pending U.S. Appl. No. 14/563,347, filed Dec. 8, 2014;Jun Lu and Yalda Farhoudi; now U. S. Publication No. 2016-0160025.

Office Action dated Jan. 21, 2016 received in co-pending U.S. Appl. No. 14/563,347.

Office Action dated May 2, 2016 received in co-pending U.S. Appl. No. 14/563,347.

Copending U.S. Appl. No. 14/563,352, filed Dec. 8, 2014, Zhou Li, et al.; now U. S. Publication No. 2016-0160026.

Copending U.S. Appl. No. 14/563,359, filed Dec. 8, 2014, Jun Lu, et al.; now U. S. Publication No. 2016-0160033.

Copending U.S. Appl. No. 14/563,364, filed Dec. 8, 2014, Jun Lu, et al.; now U. S. Publication No. 2016-0159049.

Copending U.S. Appl. No. 14/563,372, filed Dec. 8, 2014, Jun Lu, et al.; now U. S. Publication No. 2016-0160027.

Office Action dated Nov. 6, 2015 received in co-pending U.S. Appl. No. 14/563,372.

Office Action dated Mar. 22, 2016 received in co-pending U.S. Appl. No. 14/563,372.

USPTO Notice of Allowance dated Apr. 20, 2016 for copending U.S. Appl. No. 14/563,372.

Copending U.S. Appl. No. 14/563,373, filed Dec. 8, 2014, Jun Lu, et al.; now U. S. Publication No. 2016-0160028.

Copending U.S. Appl. No. 14/514,641, filed Oct. 15, 2014, Jun Lu; U. S. Publication No. 2016-0111077; now U.S. Pat. No. 9,355,631.

Office Action dated Nov. 2, 2015 received in co-pending U.S. Appl. No. 14/514,641.

USPTO Notice of Allowance dated Feb. 5, 2016 for copending U.S. Appl. No. 14/514,641.

(56) References Cited

OTHER PUBLICATIONS

Copending U.S. Appl. No. 14/882,317, filed Oct. 13, 2015, Jun Lu, et al.; now U. S. Publication No. 2016-0107424.
Copending U.S. Appl. No. 15/051,222, filed Feb. 23, 2016, Jun Lu; now U. S. Publication No. 2016-0171961.
Office Action dated Jun. 15, 2016, 2016 received in co-pending U.S. Appl. No. 15/051,222.
Copending U.S. Appl. No. 14/505,191, filed Oct. 2, 2014, Jun Lu; now U. S. Publication No. 2016-0096349.
Office Action dated Jul. 27, 2015 received in co-pending U.S. Appl. No. 14/505,191.
Office Action dated Apr. 21, 2016 received in co-pending U.S. Appl. No. 14/505,191.
Copending U.S. Appl. No. 14/505,247, filed Oct. 2, 2014, Jun Lu; now U. S. Publication No. 2016-0096350.
Office Action dated Jul. 27, 2015 received in co-pending U.S. Appl. No. 14/505,247.
Office Action dated Dec. 31, 2015 received in co-pending U.S. Appl. No. 14/505,247.
Office Action dated Apr. 22, 2016 received in co-pending U.S. Appl. No. 14/505,247.
Copending U.S. Appl. No. 14/563,378, filed Dec. 8, 2014, Jun Lu, et al.; now U. S. Publication No. 2016-0160029.
Copending U.S. Appl. No. 14/563,622, filed Dec. 8, 2014, Jun Lu, et al.; now U. S. Publication No. 2016-0159050.
Office Action dated Apr. 15, 2015 received in co-pending U.S. Appl. No. 14/299,996.
USPTO Notice of Allowance dated Sep. 9, 2015 for copending U.S. Appl. No. 14/299,996.
USPTO Notice of Allowance dated Nov. 24, 2015 for copending U.S. Appl. No. 14/299,996.
Copending U.S. Appl. No. 14/563,719, filed Dec. 8, 2014, Jun Lu, et al.; now U. S. Publication No. 2016-0159039.
Copending U.S. Appl. No. 14/563,011, filed Dec. 8, 2014, Jun Lu; now U. S. Publication No. 2016-0159041.
Copending U.S. Appl. No. 14/563,381, filed Dec. 8, 2014, Jun Lu, et al.; now U. S. Publication No. 2016-0160034.
Copending U.S. Appl. No. 15/051,183, filed Feb. 23, 2016, Spangler et al.; now U. S. Publication No. 2016-0168353.
PCT International Search Report and Written Opinion dated Jan. 22, 2015 for International Application No. PCT/US2014/041689.
PCT International Search Report and Written Opinion dated Aug. 29, 2014 for International Application No. PCT/US2014/041698.
PCT International Search Report and Written Opinion dated Jan. 26, 2016 for International Application No. PCT/US2015/063907.
PCT International Search Report and Written Opinion dated May 23, 2016 for International Application No. PCT/US2015/063908.
PCT International Search Report and Written Opinion dated Jan. 26, 2016 for International Application No. PCT/US2015/063885.
PCT International Search Report and Written Opinion dated Jan. 7, 2016 for International Application No. PCT/US2015/055633.
PCT International Search Report and Written Opinion dated Nov. 19, 2015 for International Application No. PCT/US2015/051591.
PCT International Search Report and Written Opinion dated Nov. 19, 2015 for International Application No. PCT/US2015/051593.
PCT International Search Report and Written Opinion dated Apr. 18, 2016 for International Application No. PCT/US2015/063933.
PCT International Search Report and Written Opinion dated Mar. 29, 2016 for International Application No. PCT/US2015/063944.
PCT International Search Report and Written Opinion dated Jan. 26, 2016 for International Application No. PCT/US2015/063975.
Notification of Transmittal of the International Search Report and the Written Opinion of the International Searching Authority, or the Declaration date of mailing Jul. 1, 2016 received in International Application No. PCT/US201/063900.

\* cited by examiner

POLYMER INTERLAYERS COMPRISING A BLEND OF TWO OR MORE RESINS

CROSS REFERENCE TO RELATED APPLICATION(S)

This application is a continuation of U.S. patent application Ser. No. 14/300,612, filed Jun. 10, 2014, which claims the benefit of U.S. Provisional Patent Application Ser. No. 61/833,205, filed Jun. 10, 2013, the entire disclosure of which is incorporated by reference herein.

BACKGROUND OF THE INVENTION

1. Field of the Invention

This disclosure is related to the field of polymer interlayers for multiple layer panels and multiple layer panels having at least one polymer interlayer sheet. Specifically, this disclosure is related to the field of polymer interlayers comprising blends of two or more resins.

2. Description of Related Art

Multiple layer panels are generally panels comprised of two sheets of a substrate (such as, but not limited to, glass, polyester, polyacrylate, or polycarbonate) with one or more polymer interlayers sandwiched therebetween. The laminated multiple layer glass panels are commonly utilized in architectural window applications and in the windows of motor vehicles and airplanes, and in photovoltaic solar panels. The first two applications are commonly referred to as laminated safety glass. The main function of the interlayer in the laminated safety glass is to absorb energy resulting from impact or force applied to the glass, to keep the layers of glass bonded even when the force is applied and the glass is broken, and to prevent the glass from breaking up into sharp pieces. Additionally, the interlayer may also give the glass a much higher sound insulation rating, reduce UV and/or IR light transmission, and enhance the aesthetic appeal of the associated window. In regard to the photovoltaic applications, the main function of the interlayer is to encapsulate the photovoltaic solar panels which are used to generate and supply electricity in commercial and residential applications.

The interlayer may be a single (or monolithic) layer, a combination of more than one single layer, a multilayer that has been coextruded, a combination of at least one single layer and at least one multilayer, or a combination of multilayer sheets.

In order to achieve the desired and optimal sound insulation for the glass panel, while retaining the impact performance and the optical quality necessary, it has become common practice to utilize multilayered interlayers with at least one soft "core" layer sandwiched between two more stiff or rigid "skin" layers. These layers of the interlayer are generally produced by mixing a polymer resin such as poly(vinyl butyral) with one or more plasticizers and melt processing the mix into a sheet by any applicable process or method known to one of skill in the art, including, but not limited to, extrusion, with the layers being combined by processes such as co-extrusion and lamination. Other additional ingredients may optionally be added for various other purposes. After the interlayer sheet is formed, it is typically collected and rolled for transportation and storage and for later use in the multiple layer glass panel, as discussed below.

Single or monolithic polymer interlayers having improved acoustic properties have been produced previously. One method of producing monolithic or single layer interlayers having acoustic properties is by mixing either a single PVB resin having low residual hydroxyl content (% PVOH), such as 17% or less, with higher amounts of a plasticizer, such as triethylene glycol di-(2-ethylhexanoate) (3GEH), and extruding the mixture to form a polymer interlayer. Alternatively, monolithic or single layer interlayers having acoustic properties can be produced by mixing a single PVB resin having high residual hydroxyl content, such as 18% or higher, with a high amount of a plasticizer or a mixture of plasticizers in which at least one plasticizer is more efficient in plasticizing PVB resin than conventional plasticizer (such as 3GEH). The former method is a more preferred approach. The resultant polymer interlayer having acoustic properties typically exhibits a glass transition temperature, $T_g$, of 25° C. or lower.

Interlayers with low glass transition temperatures are known to have better acoustic damping performance. Polymer interlayers having lower glass transition temperatures are generally softer, therefore multiple layer glass panels or other laminates made with these softer polymer interlayers exhibit maximum impact penetration resistance at a temperature significantly lower than ambient temperature (i.e., 23° C.). Because of this, thicker polymer interlayers are often required to satisfy the level of impact resistance required in many applications. This softer polymer interlayer, while it has good acoustic properties, is also difficult to manufacture and laminate due to its performance properties.

Multilayer interlayers such as a trilayer interlayer having a softer acoustic dampening core layer and two stiffer skin layers (which provide for improved handling of the interlayer compared to soft monolithic interlayers or interlayers having softer skin layers) are commercially available. The trilayer interlayer is typically produced by encapsulating the soft monolithic acoustic layer with two stiff skin layers through a co-extrusion process. The stiff skin layers typically exhibit a glass transition temperature, Tg, of about 30° C. or more, and the soft acoustic damping core layer typically has a Tg of less than 25° C. While the trilayer interlayer having stiff skin layers has improved handling and processing performance compared to the soft monolayer or monolithic interlayers, these multilayer interlayers are also more expensive to produce than single layer or monolithic interlayers.

Because of the presence of the soft acoustic core layer there are inherent defects with the multiple layer interlayers. One inherent defect in multiple layer interlayers is mottle, which is present in the manufacture of multilayer laminate glass panels having multiple layer interlayers in the final unitary structure. Mottle is an objectionable form of optical distortion or visual defect appearing as uneven spots, or texture. Mottle is caused by small scale surface variations at the interfaces between the soft and stiff layers wherein the individual layers (or the soft and stiff layers) have different refractive indices. Other inherent defects in multiple layer interlayers are bubbles or iceflowers (also known as snowflakes) that develop in the soft core layer in the manufacture of multilayer laminate glass panels, such as in windshields installed in vehicles or in the windows of buildings. Iceflowers are undesirable optical defects which generally are initiated from bubbles at high temperature that expand and branch in radial directions where resistance to the radial expansion is small. The softer core layer of a trilayer interlayer has low resistance to the bubble nucleation and is in favor of bubble nucleation and iceflower formation.

The use of a single or monolithic polymer interlayer in a multiple layer glass panel can eliminate the presence of mottle caused by the variations of the surface at the interfaces of the layers in the multiple layer acoustic interlayers since there is only one layer (and therefore no interfaces between layers). The monolithic polymer interlayer in a multiple layer glass panel can also eliminate the formation of iceflowers and other undesirable optical defects. But as previously discussed, a monolithic interlayer having good acoustic properties can be difficult to manufacture and laminate into a multiple layer glass panel.

In addition to mottle and iceflowers, clarity of the multiple layer panel is another important optical quality, whether or not the polymer interlayer provides sound insulation for the multiple layer panel, or whether or not the polymer is a multilayer interlayer or a monolithic interlayer. Clarity is determined by measuring the level of haze in the multiple layer panel, as further described below. The level of haze must be very low so that the multiple layer panel is clear.

In the manufacturing of polymer interlayers, it has become common practice to recycle a certain amount of the interlayer materials (such as off grade material or trim) which would otherwise be unusable and disposed of at a cost, such as land filled. This practice of recycling material has often resulted in polymer interlayers that have high haze and low visible light transmittance. The high haze or low clarity is caused by the differences in the polymers and/or plasticizers that are blended or mixed together, which causes the light to scatter in the blend or mixture in which there is a sufficiently large difference in the refractive index between the polymers or plasticizers. Accordingly, there is a need in the art for the development of an interlayer, especially a monolithic interlayer, that contains a blend or mix of polymers having different compositions and/or plasticizers while also having a high level of visible transmittance and very low haze.

It is now common to use a multilayer interlayer (such as a trilayer interlayer) to provide high performance laminates, particularly in laminates having improved acoustic performance properties. As previously discussed, the use of multilayer interlayers, however, very often results in an increased level of optical defect problems, such as mottle and haze, as well as other types of performance defects, such as iceflowers, and multilayer interlayers are more expensive to manufacture. As previously discussed, multilayer interlayers such as a trilayer interlayer having stiff skin layers typically exhibit a glass transition temperature, Tg, of about 30° C. or higher in the stiffer skin layers and a $T_g$ of less than 25° C. in the softer, acoustic damping core layer. The stiff skin layers typically contain a resin having a higher level of residual hydroxyl groups, and the soft core layer(s) typically contains a resin having a lower level of residual hydroxyl groups. The higher Tg of the stiff skin layer(s) provides such mechanical properties as impact, as well as improved handling and processing performance, while the softer core layer(s) provides acoustic damping performance.

Because monolithic interlayers having a low glass transition temperature and good acoustic performance are difficult to manufacture and laminate, there is a further need in the art for the development of a monolithic interlayer that has both good acoustic performance and improved handling and processing performance. It is advantageous to produce a monolithic interlayer containing two (or more) resins and a plasticizer, in which at least one resin has a lower level of residual hydroxyl groups and provides good acoustic performance, and at least one other resin has a higher level of residual hydroxyl groups and provides mechanical properties such as impact as well as improved handling and processing performance.

SUMMARY OF THE INVENTION

Because of these and other problems in the art, described herein, among other things, is a polymer interlayer comprising: a first poly(vinyl butyral) resin having a first residual hydroxyl content; a second poly(vinyl butyral) resin having a second residual hydroxyl content, and at least one high refractive index plasticizer having a refractive index of at least 1.460, wherein the difference between the first residual hydroxyl content and the second residual hydroxyl content is at least 2.0 weight percent. In an embodiment, a polymer interlayer comprises: a first poly(vinyl butyral) resin having a first residual hydroxyl content; a second poly(vinyl butyral) resin having a second residual hydroxyl content, wherein the difference between the first residual hydroxyl content and the second residual hydroxyl content is at least 2.0 weight percent; and a plasticizer having a refractive index of at least 1.460, wherein the polymer interlayer has at least one glass transition temperature ($T_g$) less than 25° C.

In an embodiment, a monolithic polymer interlayer comprises: a first poly(vinyl butyral) resin having a first residual hydroxyl content; a second poly(vinyl butyral) resin having a second residual hydroxyl content, wherein the difference between the first residual hydroxyl content and the second residual hydroxyl content is at least 2.0 weight percent; and a plasticizer having a refractive index of at least 1.460. In an embodiment, the first poly(vinyl butyral) resin and the second poly(vinyl butyral) resin are present in a ratio of between about 95:5 and 5:95, or in a ratio between about 90:10 and 10:90, or in a ratio between about 85:15 and 15:85, or in a ratio between about 80:20 and 20:80, or in a ratio between about 75:25 and 25:75, or in a ratio between about 70:30 and 30:70, or in a ratio between about 65:35 and 35:65, or in a ratio between about 60:40 and 40:60, or in a ratio between about 55:45 and 45:55, or about 50:50. In an embodiment, the polymer interlayer has at least one glass transition temperature ($T_g$) less than 25° C. In an embodiment, the plasticizer is selected from dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), di-(butoxyethyl) terephthalate, di-(butoxyethyoxyethyl) terephthalate, and mixtures thereof, or the plasticizer is selected from dipropylene glycol dibenzoate and tripropylene glycol dibenzoate, and 2,2,4-trimethyl-1,3-pentanediol dibenzoate. In an embodiment, the polymer interlayer further comprises a second high refractive index plasticizer having a refractive index of at least 1.460, or at least 1.470, or at least 1.480, or at least 1.490, or at least 1.500, or at least 1.510, or at least 1.520. In an embodiment, the polymer interlayer further comprises a plasticizer having a refractive index of less than about 1.450. In an embodiment, the percent haze is less than 5.0%, as measured by ASTM D1003-61 (Re-approved 1977)-Procedure A using Illuminant C, at an observer angle of 2 degrees. In an embodiment, the percent haze is less than 4.0%, or less than 3.0%, or less than 2.0%, or less than 1.0%, or less than 0.5%, as measured by ASTM D1003-61 (Re-approved 1977)-Procedure A using Illuminant C, at an observer angle of 2 degrees. In an embodiment, the polymer interlayer has at least two different glass transition temperatures ($T_g$) and the difference between the at least two different glass transition temperatures ($T_g$) is at least 5° C. In an embodiment, a monolithic polymer interlayer comprises: a first poly(vinyl butyral) resin having a first residual hydroxyl content; a second poly(vinyl butyral) resin having a second residual hydroxyl content, wherein the difference between the first residual hydroxyl content and the second residual hydroxyl content is at least 2.0 weight percent; and at least one plasticizer having a refractive index of at least 1.460 selected from dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), di-(butoxyethyl) terephthalate, di-(butoxyethyoxyethyl) terephthalate, and mixtures thereof. In an embodiment, the plasticizer is selected from dipropylene glycol dibenzoate, 2,2,4-trimethyl-1,3-pentanediol dibenzoate and tripropylene glycol dibenzoate. In an embodiment, the plasticizer has a refractive index of at least 1.470, or at least 1.480, or at least 1.490, or at least 1.500, or at least 1.510, or at least 1.520. In an embodiment, the first poly(vinyl butyral) resin and the second poly(vinyl butyral) resin are present in a ratio of between about 95:5 and 5:95, or in a ratio between about 90:10 and 10:90, or in a ratio between about 85:15 and 15:85, or in a ratio between about 80:20 and 20:80, or in a ratio between about 75:25 and 25:75, or in a ratio between about 70:30 and 30:70, or in a ratio between about 65:35 and 35:65, or in a ratio between about 60:40 and 40:60, or in a ratio between about 55:45 and 45:55, or about 50:50. In an embodiment, the polymer interlayer further comprises a second high refractive index plasticizer having a refractive index of at least 1.460, or at least 1.470, or at least 1.480, or at least 1.490, or at least 1.500, or at least 1.510, or at least 1.520. In an embodiment, the polymer interlayer further comprises a second plasticizer, wherein the second plasticizer has a refractive index of less than about 1.450. In an embodiment, the polymer interlayer has a percent haze of less than 5.0%, as measured by ASTM D1003-61 (Re-approved 1977)-Procedure A using Illuminant C, at an observer angle of 2 degrees, or less than 4.0%, or less than 3.0%, or less than 2.0%, or less than 1.0%, or less than 0.5%, as measured by ASTM D1003-61 (Re-approved 1977)-Procedure A using Illuminant C, at an observer angle of 2 degrees. In an embodiment, the polymer interlayer has at least two different glass transition temperatures ($T_g$) and the difference between at least two different glass transition temperatures ($T_g$) is at least 5° C.

In an embodiment, a monolithic polymer interlayer comprises: a first poly(vinyl butyral) resin having a first residual hydroxyl content; a second poly(vinyl butyral) resin having a second residual hydroxyl content, wherein the difference between the first residual hydroxyl content and the second residual hydroxyl content is at least 2.0 weight percent; and a plasticizer having a refractive index of at least 1.460, wherein the refractive index of the polymer interlayer is at least 1.480. In an embodiment, the refractive index of the polymer interlayer is at least 1.485. In an embodiment, the first poly(vinyl butyral) resin and the second poly(vinyl butyral) resin are present in a ratio of between 95:5 and 5:95, or in a ratio between about 90:10 and 10:90, or in a ratio between about 85:15 and 15:85, or in a ratio between about 80:20 and 20:80, or in a ratio between about 75:25 and 25:75, or in a ratio between about 70:30 and 30:70, or in a ratio between about 65:35 and 35:65, or in a ratio between about 60:40 and 40:60, or in a ratio between about 55:45 and 45:55, or about 50:50. In an embodiment, the plasticizer is selected from dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), di-(butoxyethyl) terephthalate, di-(butoxyethyoxyethyl) terephthalate, and mixtures thereof. In an embodiment, the polymer interlayer further comprises a second plasticizer, wherein the second plasticizer has a refractive index of less than about 1.450.

In embodiments, the first poly(vinyl butyral) resin and the second poly(vinyl butyral) resin are present in a ratio of between about 95:5 and 5:95, or in a ratio between about 90:10 and 10:90, or in a ratio between about 85:15 and 15:85, or in a ratio between about 80:20 and 20:80, or in a ratio between about 75:25 and 25:75, or in a ratio between about 70:30 and 30:70, or in a ratio between about 65:35 and 35:65, or in a ratio between about 60:40 and 40:60, or in a ratio between about 55:45 and 45:55, or in a ratio of about 50:50 (that is, in about equal amounts of the two resins).

In an embodiment, the plasticizer is selected from dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), di-(butoxyethyl) terephthalate, di-(butoxyethyoxyethyl) terephthalate, and mixtures thereof. In an embodiment, the plasticizer is selected from dipropylene glycol dibenzoate, 2,2,4-trimethyl-1,3-pentanediol dibenzoate and tripropylene glycol dibenzoate.

In an embodiment, the polymer interlayer further comprises a second high refractive index plasticizer having a refractive index of at least 1.460, or at least 1.470, or at least 1.480, or at least 1.490, or at least 1.500, or at least 1.510, or at least 1.520. In an embodiment, the polymer interlayer further comprises a plasticizer having a refractive index of less than about 1.450.

In an embodiment, the polymer interlayer has a percent haze of less than 5.0%, as measured by ASTM D1003-61 (Re-approved 1977)-Procedure A using Illuminant C, at an observer angle of 2 degrees. In an embodiment, the polymer interlayer has a percent haze of less than 4.0%, or less than 3.0%, or less than 2.0%, or less than 1.0%, or less than 0.5%, as measured by ASTM D1003-61 (Re-approved 1977)-Procedure A using Illuminant C, at an observer angle of 2 degrees.

In an embodiment, the difference between the first residual hydroxyl content and the second residual hydroxyl content is at least 3.0 weight percent, or at least 4.0 weight percent, at least 5.0 weight percent, at least 6.0 weight percent, at least 7.0 weight percent, at least 8.0 weight percent, at least 9.0 weight percent, at least 10.0 weight percent.

In an embodiment, the polymer interlayer has at least two different glass transition temperatures ($T_g$) and the difference between the at least two different glass transition temperatures ($T_g$) is at least 5° C.

In another embodiment, a polymer interlayer comprises: a first poly(vinyl butyral) resin having a first residual hydroxyl content; a second poly(vinyl butyral) resin having a second residual hydroxyl content, wherein the difference between the first residual hydroxyl content and the second residual hydroxyl content is at least 2.0 weight percent; and at least one plasticizer having a refractive index of at least 1.460 selected from dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), di-(butoxyethyl) terephthalate, di-(butoxyethyoxyethyl) terephthalate, and mixtures thereof. In an embodiment, the plasticizer is selected from dipropylene glycol dibenzoate, 2,2,4-trimethyl-1,3-pentanediol dibenzoate, and tripropylene glycol dibenzoate. In embodiments, the first poly(vinyl butyral) resin and the second poly(vinyl butyral) resin are present in a ratio of between about 95:5 and 5:95, or in a ratio between about 90:10 and 10:90, or in a ratio between about 85:15 and 15:85, or in a ratio between about 80:20 and 20:80, or in a ratio between about 75:25 and 25:75, or in a ratio between about 70:30 and 30:70, or in a ratio between about 65:35 and 35:65, or in a ratio between about 60:40 and 40:60, or in a ratio between about 55:45 and 45:55, or about 50:50.

In an embodiment, the polymer interlayer further comprises a second high refractive index plasticizer having a refractive index of at least 1.460. In an embodiment, the polymer interlayer further comprises a plasticizer having a refractive index of less than about 1.450.

In an embodiment, the polymer interlayer has a percent haze of less than 5.0%, as measured by ASTM D1003-61 (Re-approved 1977)-Procedure A using Illuminant C, at an observer angle of 2 degrees.

In an embodiment, the difference between the first residual hydroxyl content and the second residual hydroxyl content is at least 3.0 weight percent, or at least 4.0 weight percent, at least 5.0 weight percent, at least 6.0 weight percent, at least 7.0 weight percent, at least 8.0 weight percent, at least 9.0 weight percent, at least 10.0 weight percent.

In an embodiment, the polymer interlayer has at least two different glass transition temperatures ($T_g$) and the difference between at least two different glass transition temperatures ($T_g$) is at least 5° C.

In an embodiment, a monolithic polymer interlayer comprises: a first poly(vinyl butyral) resin having a first residual hydroxyl content; a second poly(vinyl butyral) resin having a second residual hydroxyl content, wherein the difference between the first residual hydroxyl content and the second residual hydroxyl content is at least 4.0 weight percent and wherein the first poly(vinyl butyral) resin and the second poly(vinyl butyral) resin are present in a ratio of between 95:5 and 5:95; and at least one plasticizer having a refractive index of at least 1.460, wherein the polymer interlayer has at least two different transition temperatures ($T_g$) and the difference between at least two different glass transition temperatures ($T_g$) is at least 5° C., and wherein at least one glass transition temperature ($T_g$) is less than 25° C.

In an embodiment, a multilayer polymer interlayer comprises: a first polymer layer comprising the polymer interlayer as disclosed herein, and at least a second polymer layer that is stiffer than the first polymer layer. In an embodiment, a multilayer polymer interlayer comprises: a first polymer layer comprising the polymer interlayer as disclosed herein, and at least a second polymer layer and a third polymer interlayer, wherein the second and third polymer interlayers are stiffer than the first polymer layer, and wherein the first polymer layer is between the second and third polymer layers.

A method of making a polymer interlayer is also disclosed, wherein the polymer interlayer comprises a blend of at least two poly(vinyl butyral) resins and at least one high refractive index plasticizer, as disclosed herein.

A multiple layer panel is also disclosed. The multiple layer panel comprises at least one rigid substrate, and a polymer interlayer as disclosed herein. The panel has improved optical properties and acoustic performance.

In certain embodiments, the rigid substrate is glass. In other embodiments, the panel may further comprise a photovoltaic cell, with the interlayer encapsulating the photovoltaic cell.

DESCRIPTION OF THE PREFERRED EMBODIMENT(S)

Described herein, among other things, are polymer interlayers comprised of a blend of two or more thermoplastic resins and at least one high refractive index plasticizer. The two thermoplastic resins have different residual hydroxyl contents (measured as % PVOH by weight). The plasticizer has a refractive index value of at least 1.460. The combination of the blend of resins having different residual % PVOH content by weight and the high refractive index plasticizer also creates an interlayer having good acoustic and impact properties as well as increased transparency (or high visual transmittance) and low haze without sacrificing other characteristics.

A combination of more than one plasticizer may also be used, such as, for example, two high refractive index plasticizers, or one high refractive index plasticizer and one conventional or other plasticizer having a lower refractive index, depending on the final properties desired. In this regard, the plasticizer (or combination of plasticizers), when selected to have a certain refractive index, and the combination of resins having different levels of residual hydroxyl contents (and other conventional additives), results in an interlayer having excellent optical properties as measured by at least transparency (visible transmittance) and haze, as well as acoustic, impact and other performance properties. Additionally, the previous handling problems associated with a monolithic interlayer having good acoustic properties are eliminated.

Some terminology used throughout this application will be explained to provide a better understanding of the invention. The terms "polymer interlayer sheet," "interlayer," and "polymer melt sheet" as used herein, generally may designate a single-layer sheet or a multilayered interlayer. A "single-layer sheet," as the names implies, is a single or monolithic polymer layer extruded as one layer. A multilayered interlayer, on the other hand, may comprise multiple layers, including separately extruded layers, co-extruded layers, or any combination of separately and co-extruded layers. Thus the multilayered interlayer could comprise, for example: two or more single-layer sheets combined together ("plural-layer sheet"); two or more layers co-extruded together ("co-extruded sheet"); two or more co-extruded sheets combined together; a combination of at least one single-layer sheet and at least one co-extruded sheet; a combination of at least one plural-layer sheet and at least one co-extruded sheet, or any other combination of sheets as desired. Although the embodiments described below refer to the polymer resin as being PVB, it would be understood by one of ordinary skill in the art that the polymer may be any polymer suitable for use in a multiple layer panel. Typical polymers include, but are not limited to, polyvinyl acetals (PVA) (such as poly(vinyl butyral) (PVB)), polyurethane (PU), poly(ethylene-co-vinyl acetate) (EVA), polyvinylchloride (PVC), poly(vinylchloride-co-methacrylate), polyethylenes, polyolefins, ethylene acrylate ester copolymers, poly (ethylene-co-butyl acrylate), silicone elastomers, epoxy resins, and acid copolymers such as ethylene/carboxylic acid copolymers and its ionomers, derived from any of the foregoing possible thermoplastic resins, combinations of the foregoing, and the like. PVB, polyvinyl chloride, and polyurethane are useful polymers generally for interlayers; PVB is particularly useful when used in conjunction with the interlayers of this disclosure.

The plasticizer or mixture of plasticizers and the blend of resins having different residual hydroxyl contents are selected such that the polymer interlayer has excellent acoustic and impact properties, without reducing transparency and clarity. To improve the acoustic properties, the two (or more) resins are selected such that the difference between the residual hydroxyl content of the resins is at least 2 weight percent (wt. %), or at least 3 wt. %, or at least 4 wt. %, or at least 5 wt. %, or at least 6 wt. %, or at least 7%, or at least 8 wt. %, or at least 9 wt. %, or at least 10 wt. %, or at least 15 wt. %, or at least 20 wt. %, and can be greater than 25 wt. % in some embodiments, such as up to 30 wt. % or up to 35 wt. %. Additionally, a high refractive index plasticizer is used to minimize the refractive index between the blend of resins and the plasticizer(s). For example, the difference between the refractive index of the resin and the refractive index of the plasticizer (delta RI) in commercially available products may be 0.050 or even 0.070 or more, depending on the particular resin(s) and plasticizer selected. The use of at least one high refractive index plasticizer allows the refractive index difference (delta RI) to be minimized.

In the interlayer comprising poly(vinyl butyral) ("PVB") resin and plasticizer, it has been common that the plasticizer is selected from plasticizers such as triethylene glycol di-(2-ethylhexanoate) ("3GEH"), triethylene glycol di-(2-ethylbutyrate), triethylene glycol diheptanoate, tetraethylene glycol diheptanoate, tetraethylene glycol di-(2-ethylhexanoate), dihexyl adipate, dioctyl adipate, hexyl cyclohexyladipate, diisononyl adipate, heptylnonyl adipate, di(butoxyethyl) adipate, and bis(2-(2-butoxyethoxy)ethyl) adipate, dibutyl sebacate, dioctyl sebacate, and mixtures thereof. These plasticizers have refractive indices of about 1.442 to about 1.449. In comparison, PVB resin has a refractive index of approximately 1.485 to 1.495. As used herein, plasticizer having a refractive index of about 1.450 or less is referred to as a "conventional plasticizer". 3GEH (refractive index=1.442) is the most common plasticizer present in interlayers manufactured for various properties and applications. In blends of two or more PVB resins having different residual % PVOH contents wherein the residual hydroxyl content varies by at least 2 weight percent, the plasticizer will preferentially partition in the resin having the lower residual % PVOH content. Because of this difference, the final polymer interlayer produced using a conventional plasticizer (refractive index less than about 1.450 as noted above) exhibits multiple domains of different refractive indices, which can result in light being refracted in different directions, which causes haze in the final product. In previous attempts to produce such monolithic interlayers having two (or more) PVB resins having different levels of residual hydroxyl groups, the resulting interlayers had high levels of haze and reduced visual transmittance (% $T_{vis}$), both of which are undesirable in a multilayer laminate glass panel, such as a windshield.

Increasing the refractive index of the plasticizer used with the blend of resins can minimize the difference in refractive index between the domains of plasticized PVB resin having higher residual % PVOH content and plasticized PVB resin having lower residual % PVOH content, thereby reducing and minimizing the formation of haze. The polymer interlayer can also be made transparent by selecting a plasticizer or mixture of plasticizers having a higher refractive index.

Prior to discussing the addition of the specific plasticizer or plasticizers selected to produce the interlayer having improved optical quality, some common components found in an interlayer, both generally and in interlayers of the present disclosure, and the formation thereof.

The PVB resin is produced by known aqueous or solvent acetalization processes by reacting polyvinyl alcohol ("PVOH") with butyraldehyde in the presence of an acid catalyst, separation, stabilization, and drying of the resin. Such acetalization processes are disclosed, for example, in U.S. Pat. Nos. 2,282,057 and 2,282,026 and Vinyl Acetal Polymers, in Encyclopedia of Polymer Science & Technology, 3rd edition, Volume 8, pages 381-399, by B. E. Wade (2003), the entire disclosures of which are incorporated herein by reference. The resin is commercially available in various forms, for example, as Butvar® Resin from Solutia Inc. (which is a wholly owned subsidiary of Eastman Chemical Company).

As used herein, residual hydroxyl content (calculated as % PVOH by weight) in PVB refers to the amount of hydroxyl groups remaining on the polymer chains after processing is complete. For example, PVB can be manufactured by hydrolyzing poly(vinyl acetate) to PVOH, and then reacting the PVOH with butyraldehyde. In the process of hydrolyzing the poly(vinyl acetate), typically not all of the acetate side groups are converted to hydroxyl groups. Further, reaction with butyraldehyde typically will not result in all hydroxyl groups being converted to acetal groups. Consequently, in any finished PVB resin, there typically will be residual acetate groups (as vinyl acetate groups) and residual hydroxyl groups (as vinyl hydroxyl groups) as side groups on the polymer chain. As used herein, residual hydroxyl content is measured on a weight percent basis per ASTM 1396.

In various embodiments, the PVB resin comprises about 8 to about 45 weight percent (wt. %) hydroxyl groups calculated as % PVOH, or about 10 to about 35 wt. % hydroxyl groups calculated as % PVOH. The resin can also comprise less than 30 wt. % residual ester groups, less than 20 wt. %, less than 15 wt. %, less than 13 wt. %, less than 11 wt. %, less than 9 wt. %, less than 7 wt. %, less than 5 wt. %, or less than 1 wt. % residual ester groups calculated as polyvinyl ester, e.g., acetate, with the balance being an acetal, preferably butyraldehyde acetal, but optionally being other acetal groups, for example, a 2-ethyl hexanal group, or the mix of butyraldehyde and 2-ethyl hexanal groups.

In various embodiments, where the interlayer comprises at least two different PVB resins, the residual hydroxyl contents of the two (or more) different PVB resins used in the polymer interlayer will be different to provide certain performance characteristics not found in monolithic interlayers currently produced. One PVB resin, for example, can comprise about 8 to about 18 weight percent (wt. %) residual hydroxyl groups calculated as % PVOH, about 8 to about 16 wt. % residual hydroxyl groups calculated as % PVOH, or about 8 to about 14 wt. % residual hydroxyl groups calculated as % PVOH. The second PVB resin, for example, can comprise about 13 to about 45 weight percent (wt. %) residual hydroxyl groups calculated as % PVOH, about 15 to about 40 wt. % residual hydroxyl groups calculated as % PVOH, or about 18 to about 35 wt. % residual hydroxyl groups calculated as % PVOH; or, for certain embodiments, about 20 to about 35 wt. % residual hydroxyl groups calculated as % PVOH. Each of the resins can also comprise less than 30 wt. % residual ester group, less than 20 wt. % residual ester groups, less than 15 wt. %, less than 13 wt. %, less than 11 wt. %, less than 9 wt. %, less than 7 wt. %, less than 5 wt. %, or less than 1 wt. % residual ester groups calculated as polyvinyl ester, e.g., acetate, with the balance being an acetal, such as butyraldehyde acetal, but optionally being other acetal groups, for example, a 2-ethyl hexanal group, or the mix of butyraldehyde and 2-ethyl hexanal acetals as previously discussed.

For a given type of plasticizer, the compatibility of the plasticizer in the PVB polymer is largely determined by the hydroxyl content of the polymer. PVB with greater residual hydroxyl content is typically correlated with reduced plasticizer compatibility or capacity, i.e., less plasticizer could be incorporated, and the resultant plasticized PVB is stiffer and has a higher glass transition temperature. Conversely, PVB with a lower residual hydroxyl content typically will result in increased plasticizer compatibility or capacity, i.e., more plasticizer could be incorporated, and the resultant plasticized PVB is softer and has a lower glass transition temperature. For some plasticizer types, such correlation might be reversed. When two PVB resins having different levels of residual hydroxyl contents and a plasticizer are blended together, the plasticizer will partition such that there is more plasticizer in the PVB resin having the lower residual hydroxyl content and less plasticizer in the PVB resin having the higher residual hydroxyl content, and it will ultimately reach an equilibrium state between the two PVB resins. This correlation between the residual hydroxyl content of a polymer and plasticizer compatibility/capacity allows for addition of the proper amount of plasticizer to the polymer resin. The correlation also helps to stably maintain differences in plasticizer content between multiple PVB resins where the plasticizer would otherwise migrate between the resins.

The PVB resins of the present disclosure typically have a molecular weight of greater than 50,000 Daltons, or less than 500,000 Daltons, or about 50,000 to about 500,000 Daltons, or about 70,000 to about 500,000 Daltons, or more preferably about 100,000 to about 425,000 Daltons, as measured by size exclusion chromatography using low angle laser light scattering. As used herein, the term "molecular weight" means the weight average molecular weight.

Various adhesion control agents ("ACAs") can be used in the interlayers of the present disclosure to control the adhesion of the sheet to glass. In various embodiments of interlayers of the present disclosure, the interlayer can comprise about 0.003 to about 0.15 parts ACAs per 100 parts resin; about 0.01 to about 0.10 parts ACAs per 100 parts resin; and about 0.01 to about 0.04 parts ACAs per 100 parts resin. Such ACAs, include, but are not limited to, the ACAs disclosed in U.S. Pat. No. 5,728,472 (the entire disclosure of which is incorporated herein by reference), residual sodium acetate, potassium acetate, magnesium bis(2-ethyl butyrate), and/or magnesium bis(2-ethylhexanoate).

Other additives may be incorporated into the interlayer to enhance its performance in a final product and impart certain additional properties to the interlayer. Such additives include, but are not limited to, dyes, pigments, stabilizers (e.g., ultraviolet stabilizers), antioxidants, anti-blocking agents, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers, among other additives known to those of ordinary skill in the art.

In various embodiments of interlayers of the present disclosure, the interlayer can comprise greater than 10 µhr (parts per hundred parts resin) plasticizer(s), or less than 120 µhr, or 10 to about 120 µhr, or about 20 to 90 µhr, or about 30 to 70 µhr plasticizer(s), or in embodiments, about 30 to 65 µhr plasticizer(s). Of course, other quantities can be used as is appropriate for the particular application and the desired properties.

As used herein, the amount of plasticizer, or any other component in the interlayer, can be measured as parts per hundred parts resin (phr), on a weight per weight basis. For example, if 30 grams of plasticizer is added to 100 grams of polymer resin, then the plasticizer content of the resulting plasticized polymer would be 30 µhr. As used herein, when the plasticizer content of the interlayer is given, the plasticizer content is determined with reference to the phr of the plasticizer in the mix or melt that was used to produce the interlayer or in the interlayer.

In some embodiments, a conventional plasticizer may be used in conjunction with a high refractive index plasticizer. As noted above, examples of suitable conventional plasticizers include, for example, triethylene glycol di-(2-ethylhexanoate) ("3GEH"), triethylene glycol di-(2-ethylbutyrate), triethylene glycol diheptanoate, tetraethylene glycol diheptanoate, tetraethylene glycol di-(2-ethylhexanoate), dihexyl adipate, dioctyl adipate, hexyl cyclohexyladipate, diisononyl adipate, heptylnonyl adipate, di(butoxyethyl) adipate, bis(2-(2-butoxyethoxy)ethyl) adipate, dibutyl sebacate, dioctyl sebacate, and mixtures thereof. In some embodiments, the conventional plasticizer is 3GEH. As noted above, the refractive index of conventional plasticizers is typically from about 1.442 to about 1.449, and the refractive index of 3GEH is about 1.442.

As discussed above, increasing the refractive index of the plasticizer in a polymer interlayer comprising a blend of two (or more) resins having different residual hydroxyl contents can minimize the difference in refractive index between resin and plasticizer, thereby minimizing the amount of haze and retaining the high level of transparency in the polymer interlayer. One way to minimize the refractive index difference is to use a higher refractive index plasticizer. Examples of types or classes of plasticizers having higher refractive index that may be used include, but are not limited to, polyadipates (RI of about 1.460 to about 1.485); epoxides such as epoxidized soybean oils (RI of about 1.460 to about 1.480); phthalates and terephthalates (RI of about 1.480 to about 1.540); benzoates and toluates (RI of about 1.480 to about 1.550); and other specialty plasticizers (RI of about 1.490 to about 1.520). Examples of suitable plasticizers include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), di-(butoxyethyl) terephthalate, di-(butoxyethoxyethyl) terephthalate, and mixtures thereof. Examples of particularly suitable plasticizers are dipropylene glycol dibenzoate, tripropylene glycol dibenzoate, and 2,2,4-trimethyl-1,3-pentanediol dibenzoate. The refractive index of poly(vinyl butyral) resin is approximately 1.485 to 1.495. In some embodiments, the high refractive index plasticizer has a refractive index of at least about 1.460, or at least about 1.470, or at least about 1.480, or at least about 1.490, or at least 1.500, or at least 1.510, or at least 1.520 or higher. In embodiments, a mixture of plasticizers is used, and the refractive index of the plasticizer mixture is at least 1.460, or at least about 1.470, or at least about 1.480, or at least about 1.490, or greater than 1.490.

As used herein, the refractive index (also known as index of refraction) of a plasticizer or a resin used in the entirety of this disclosure is either measured in accordance with ASTM D542 at a wavelength of 589 nm and 25° C. or as documented or reported in open literature in accordance with the ASTM D542.

Plasticizers work by embedding themselves between chains of polymers, spacing them apart (increasing the "free volume") and thus significantly lowering the glass transition temperature ($T_g$) of the polymer resin (typically by 0.5 to 4° C./phr), making the material softer. In this regard, the amount of plasticizer in the interlayer can be adjusted to affect the glass transition temperature ($T_g$). The glass transition temperature ($T_g$) is the temperature that marks the transition from the glassy state of the polymer to the rubbery state. In general, higher amounts of plasticizer loading will result in lower $T_g$. Conventional interlayers generally have a $T_g$ in the range of about 0° C. for acoustic (noise reducing) interlayer to about 45° C. for hurricane and aircraft interlayer applications.

An interlayer's glass transition temperature is also correlated with the stiffness of the interlayer, and in general, the higher the glass transition temperature, the stiffer the interlayer. Generally, an interlayer with a glass transition temperature of 30° C. or higher increases windshield strength and torsional rigidity. A softer interlayer (generally characterized by an interlayer with a glass transition temperature of lower than 30° C.), on the other hand, contributes to the sound dampening effect (i.e., the acoustic characteristics). The interlayers of the present disclosure have multiple glass transition temperatures, such as one $T_g$ of about −40° C. to about 20° C., or about 20° C. or less, or about 15° C. or less, or about 0° C. to 10° C., and a second $T_g$ of about 25° C. to about 65° C. or greater, or about 25° C. or greater, or about 30° C. or greater, or about 35° C. or greater, or about 35° C. to 60° C., or about 65° C. or less. In some embodiments, the polymer interlayers of the present disclosure combine these two advantageous properties (i.e., strength and acoustic) by utilizing a combination of two (or more) resins with a high refractive index plasticizer such that the difference between the refractive indices of the resins and the plasticizer are minimized. These configurations are merely exemplary and are in no way meant to be limiting to the types of interlayer configurations contemplated by this disclosure.

It is contemplated that polymer interlayer sheets as described herein may be produced by any suitable process known to one of ordinary skill in the art of producing polymer interlayer sheets that are capable of being used in a multiple layer panel (such as a glass laminate or a photovoltaic module or solar panel). For example, it is contemplated that the polymer interlayer sheets may be formed through solution casting, compression molding, injection molding, melt extrusion, melt blowing or any other procedures for the production and manufacturing of a polymer interlayer sheet known to those of ordinary skill in the art. Further, in embodiments where multiple polymer interlayers are utilized, it is contemplated that these multiple polymer interlayers may be formed through co-extrusion, blown film, dip coating, solution coating, blade, paddle, air-knife, printing, powder coating, spray coating or other processes known to those of ordinary skill in the art. While all methods for the production of polymer interlayer sheets known to one of ordinary skill in the art are contemplated as possible methods for producing the polymer interlayer sheets described herein, this application will focus on polymer interlayer sheets produced through the extrusion and co-extrusion processes. The final multiple layer glass panel laminate of the present invention are formed using processes known in the art.

Generally, in its most basic sense, extrusion is a process used to create objects of a fixed cross-sectional profile. This is accomplished by pushing or drawing a material through a die of the desired cross-section for the end product.

Generally, in the extrusion process, thermoplastic resin and plasticizers, including any of those resins and plasticizers described above, are pre-mixed and fed into an extruder device. Additives such as ACAs, colorants and UV inhibitors (in liquid, powder, or pellet form) are often used and can be mixed into the thermoplastic resins or plasticizer(s) prior to arriving in the extruder device. These additives are incorporated into the thermoplastic polymer resin, and by extension the resultant polymer interlayer sheet, to enhance certain properties of the polymer interlayer sheet and its performance in the final multiple layer glass panel product.

Generally, the thickness, or gauge, of the polymer interlayer sheet will be in a range from about 10 mils to 100 mils (about 0.25 mm to about 2.54 mm), about 10 mils to 90 mils (about 0.25 mm to about 2.29 mm), about 15 mils to 60 mils (about 0.38 mm to about 1.52 mm), about 20 mils to about 50 mils (about 0.51 to 1.27 mm), and about 15 mils to about 35 mils (about 0.38 to about 0.89 mm).

In any of these embodiments, the plasticizer(s) can be any of those described above. In some embodiments, the resins and plasticizer are selected such that the interlayer has very low haze and good acoustic properties. In some embodiments, the plasticizer is selected such that the delta RI between the resins and plasticizer is minimized, such as about less than 0.070, less than 0.065, less than 0.060, less than 0.055, or less than 0.050, less than 0.045, less than 0.040, less than 0.035, or less than 0.030, less than 0.025, less than 0.020, less than 0.015, or less than 0.010, or about 0.000 (or no significant difference). In some embodiments, the plasticizer is selected such that the refractive index of the plasticizer is higher than the resins, for example, the refractive index may be greater than 1.495, or greater than 1.500, or greater than 1.510, or greater than 1.520, or greater than 1.530, or greater than 1.540. In various embodiments, the high refractive index plasticizer(s) is selected such that the refractive index of the plasticizer is greater than about 1.460, or greater than about 1.470, or greater than about 1.480, or greater than 1.490, or greater than 1.500, or greater than 1.510, or greater than 1.520. In some embodiments, the high refractive index plasticizer is used in conjunction with a second high refractive index plasticizer and/or a conventional plasticizer, and in some embodiments, if included, the conventional plasticizer is triethylene glycol di-(2-ethylhexanoate) ("3GEH").

While the present invention discloses monolithic polymer interlayers comprising blends of two or more poly(vinyl butyral) resin having different hydroxyl content and at least one plasticizer having a refractive index of at least 1.460, as would be understood by one of ordinary skill in the art, embodiments of multilayer interlayers comprising at least one layer of the monolithic polymer interlayer disclosed herein are encompassed by the present invention. For example, a multilayer interlayer such as a trilayer may comprise a soft core layer and two stiff skin layers, and the soft core can be chosen from the various embodiments of the present invention along with two stiff layers to provide a multilayer interlayer having improved mottle and reduced levels of iceflower while providing excellent visual properties and acoustic performance.

As used herein, a multiple layer panel can comprise a single substrate, such as glass, acrylic, or polycarbonate with a polymer interlayer sheet disposed thereon, and most commonly, with a polymer film further disposed over the polymer interlayer. The combination of polymer interlayer sheet and polymer film is commonly referred to in the art as a bilayer. A typical multiple layer panel with a bilayer construct is: (glass)//(polymer interlayer sheet)//(polymer film), where the polymer interlayer sheet can comprise multiple interlayers, as noted above. The polymer film supplies a smooth, thin, rigid substrate that affords better optical character than that usually obtained with a polymer interlayer sheet alone and functions as a performance enhancing layer. Polymer films differ from polymer interlayer sheets, as used herein, in that polymer films do not themselves provide the necessary penetration resistance and glass retention properties, but rather provide performance improvements, such as infrared absorption characteristics. Poly(ethylene terephthalate) ("PET") is the most commonly used polymer film. Generally, as used herein, a polymer film is thinner than a polymer sheet, such as from about 0.001 to 0.25 mm thick.

The interlayers of the present disclosure will most commonly be utilized in multiple layer panels comprising two substrates, preferably a pair of glass sheets (or other rigid materials, such as polycarbonate or acrylic, known in the art), with the interlayers disposed between the two substrates. An example of such a construct would be: (glass)//(polymer interlayer sheet)//(glass), where the polymer interlayer sheet comprises a mixture of two (or more) PVB resins having different residual hydroxyl contents and a high refractive index plasticizer (or combination of plasticizers) wherein the difference between the hydroxyl contents of the two PVB resins is at least 2 wt. %, and wherein the refractive index difference between the resins and plasticizer(s) is within the desired range. Stated differently, the difference between the residual hydroxyl contents of the two resins is at least 2 wt. %, and/or the delta RI between the resin and plasticizer is minimized (less than 0.070, or less than 0.050), and the plasticizer is a high refractive index plasticizer (at least about 1.460), such that the clarity of the multiple layer panel is excellent (having minimal haze and excellent transparency) as well as good impact and acoustic properties. These examples of multiple layer panels are in no way meant to be limiting, as one of ordinary skill in the art would readily recognize that numerous constructs other than those described above could be made with the interlayers of the present disclosure.

The typical glass lamination process comprises the following steps: (1) assembly of the two substrates (e.g., glass) and interlayer; (2) heating the assembly via an IR radiant or convective means for a short period; (3) passing the assembly into a pressure nip roll for the first deairing; (4) heating the assembly a second time to about 60° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperatures between 135° C. and 150° C. and pressures between 150 psig and 200 psig for about 30 to 90 minutes.

Other means for use in de-airing of the interlayer-glass interfaces (steps 2-5) known in the art and that are commercially practiced include vacuum bag and vacuum ring processes in which a vacuum is utilized to remove the air.

Clarity is a parameter used to describe the polymer interlayers disclosed herein. Clarity is determined by measuring the haze value or percent. Light that is scattered upon passing through a film or sheet of a material can produce a hazy or smoky field when objects are viewed through the material. Thus, the haze value is a quantification of the scattered light by a sample in contrast to the incident light. The test for percent haze is performed with a hazemeter, such as Model D25 available from Hunter Associates (Reston, Va.), and in accordance with ASTM D1003-61 (Re-approved 1977)-Procedure A using Illuminant C, at an observer angle of 2 degrees. The polymer interlayers are laminated with a pair of clear glass sheets each of 2.3 mm thick (commercially available from Pittsburgh Glass Works of Pennsylvania) and the haze values are measured. The interlayers of the present disclosure have a percent haze of less than about 5%, less than about 4%, less than about 3%, less than about 2%, less than about 1%, or less than about 0.5%.

Transparency, or percent visual transmittance (% $T_{vis}$) is also used to describe the polymer interlayers disclosed herein. The transparency is measured with a hazemeter, such as Model D25 available from Hunter Associates (Reston, Va.), and in Illuminant D65, at an observer angle of 10 degrees. The polymer interlayers are laminated with a pair of clear glass sheets each of 2.3 mm thick (commercially available from Pittsburgh Glass Works of Pennsylvania) and the % $T_{vis}$ are measured. The polymer interlayers of the present disclosure have a % $T_{vis}$ of greater than 85 for the interlayers containing only additives of ACAs, UV stabilizers, and antioxidant, or greater than 80% for the interlayers containing additional additives such as pigments, IR absorbers or blockers as mentioned above. Polymer interlayers containing high levels of pigments and/or dyes may have lower % $T_{vis}$ values as desired, such as in mass pigmented or colored polymer interlayers.

The glass transition temperature is also used to describe the polymer interlayers of the present disclosure. The glass transition temperature ($T_g$) was determined by dynamical mechanical thermal analysis (DMTA). The DMTA measures the storage (elastic) modulus (G') in Pascals, loss (viscous)

modulus (G") in Pascals, tan delta (=G"/G') of the specimen as a function of temperature at a given frequency, and temperature sweep rate. A frequency of 1 Hz and temperature sweep rate of 3° C./min were used herein. The $T_g$ is then determined by the position of the tan delta peak on the temperature scale in ° C.

The refractive index (RI) was measured in accordance with ASTM D542. The reported RI values are obtained at 589 nm and 25° C.

The loss factor ($\eta$) was measured by Mechanical Impedance Measurement as described in ISO 16940. A laminated glass bar sample of 25 mm wide, 300 mm long, and having a pair of 2.3 mm clear glass is prepared and excited at the center point of the bar by a vibration shaker (Brüel and Kjær). An impedance head (Brüwl and Kjær) is used to measure the force to excite the bar to vibrate and the velocity of the vibration and the resultant transfer function is recorded on a National Instrument data acquisition and analysis system. The loss factor at the first vibration mode is calculated using the half-power method.

The invention also includes the following Embodiments 1 to 12, set forth below.

Embodiment 1 is a monolithic polymer interlayer comprising: a first poly(vinyl butyral) resin having a first residual hydroxyl content; a second poly(vinyl butyral) resin having a second residual hydroxyl content, wherein the difference between the first residual hydroxyl content and the second residual hydroxyl content is at least 2.0 weight percent; and a plasticizer having a refractive index of at least 1.460.

Embodiment 2 is monolithic polymer interlayer comprising: a first poly(vinyl butyral) resin having a first residual hydroxyl content; a second poly(vinyl butyral) resin having a second residual hydroxyl content, wherein the difference between the first residual hydroxyl content and the second residual hydroxyl content is at least 2.0 weight percent; and a plasticizer having a refractive index of at least 1.460, wherein the refractive index of the polymer interlayer is at least 1.480.

Embodiment 3 is a polymer interlayer that includes the features of any of Embodiments 1 to 2, wherein the plasticizer is selected from dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), di-(butoxyethyl) terephthalate, di-(butoxyethyoxyethyl) terephthalate, and mixtures thereof.

Embodiment 4 is a monolithic polymer interlayer comprising: a first poly(vinyl butyral) resin having a first residual hydroxyl content; a second poly(vinyl butyral) resin having a second residual hydroxyl content, wherein the difference between the first residual hydroxyl content and the second residual hydroxyl content is at least 2.0 weight percent; and at least one plasticizer having a refractive index of at least 1.460 selected from dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), di-(butoxyethyl) terephthalate, di-(butoxyethyoxyethyl) terephthalate, and mixtures thereof.

Embodiment 5 is a polymer interlayer that includes the features of any of Embodiments 1 to 4, wherein the first poly(vinyl butyral) resin and the second poly(vinyl butyral) resin are present in a ratio of between about 95:5 and 5:95.

Embodiment 6 is a polymer interlayer that includes the features of any of Embodiments 1 to 5, wherein the polymer interlayer has at least one glass transition temperature ($T_g$) less than 25° C.

Embodiment 7 is a polymer interlayer that includes the features of any of Embodiments 1 to 6, wherein the plasticizer is selected from dipropylene glycol dibenzoate and tripropylene glycol dibenzoate, and 2,2,4-trimethyl-1,3-pentanediol dibenzoate.

Embodiment 8 is a polymer interlayer that includes the features of any of Embodiments 1 to 7 that further comprises a second high refractive index plasticizer having a refractive index of at least 1.460.

Embodiment 9 is a polymer interlayer that includes the features of any of Embodiments 1 to 8 that further comprises a plasticizer having a refractive index of less than about 1.450.

Embodiment 10 is a polymer interlayer that includes the features of any of Embodiments 1 to 9, wherein the percent haze is less than 5.0%, as measured by ASTM D1003-61 (Re-approved 1977)-Procedure A using Illuminant C, at an observer angle of 2 degrees.

Embodiment 11 is a polymer interlayer that includes the features of any of Embodiments 1 to 10, wherein the polymer interlayer has at least two different glass transition temperatures ($T_g$) and the difference between the at least two different glass transition temperatures ($T_g$) is at least 5° C.

Embodiment 12 is a polymer interlayer that includes the features of any of Embodiments 1 to 11, wherein the refractive index of the polymer interlayer is at least 1.485.

EXAMPLES

The significant improvements (or reduction) in the level of haze in a monolithic interlayer when using a blend of resins having different residual hydroxyl content (% PVOH) with a higher refractive index plasticizer or mix of plasticizers can be most readily appreciated by a comparison of monolithic interlayers made using a blend of two resins having different residual hydroxyl contents (% PVOH) along with a high refractive index plasticizer(s) compared to monolithic interlayers not having a blend of two resins having different residual hydroxyl contents (% PVOH) along with a high refractive index plasticizer(s). These Examples demonstrate the improved or lower levels of haze and the higher transparency (or percent visible transmittance), along with other advantageous qualities, when a high refractive index plasticizer is used in combination with a blend of resins having differing residual hydroxyl content (% PVOH).

The Disclosed Interlayers (Samples D1 to D29) and Conventional (or Control) Interlayers (Samples C1 to C12) were produced by mixing and melt-extruding mixtures of one or more poly(vinyl butyral) resins and one or more plasticizers, in amounts shown in the Tables, along with other common additives such as ACAs, UV stabilizers or absorbers, and antioxidants. The poly(vinyl butyral) resins, PVB-1, PVB-2 and PVB-3 each had a different weight percent of residual hydroxyl groups (% PVOH). The amounts used and results are as shown in the Tables below.

The materials used in Examples of Tables 1, 2A, 2B, 3A and 3B below are as follows:

PVB-1: polyvinyl butyral resin with 21 wt. % residual hydroxyl content, vinyl acetate residue of about 2%
PVB-2: polyvinyl butyral resin with 11 wt. % residual hydroxyl content, vinyl acetate residue of about 2%
PVB-3: polyvinyl butyral resin with 9.5 wt. % residual hydroxyl content, vinyl acetate residue of about 2%
3GEH: triethylene glycol bis(2-ethylhexanoate); RI=1.442 at 25° C.
Plasticizer 1: Blend of 3GEH and Benzoflex® 2088 (mixture of benzoic acid esters) at 10:34 weight ratio; RI=1.513 at 25° C.
Plasticizer 2: Benzoflex® 131 (Isodecyl benzoate); Refractive index=1.490 at 25° C.
Plasticizer 3: Benzoflex® 9-88 (dipropylene glycol dibenzoate); Refractive index=1.530 at 25° C.
Plasticizer 4: Benzoflex® 181 (2-Ethylhexyl benzoate); Refractive index=1.489 at 25° C.

Samples of both Conventional and Disclosed Interlayers were made according to the methods described above, with conventional plasticizer (for the control or Conventional Interlayers) or different high refractive index plasticizer (for the Disclosed Interlayers) and two different PVB resins (PVB-1, which has a high % PVOH level, and PVB-2, which has a lower % PVOH level). Control or baseline samples with only one PVB resin were also made. The interlayer Samples were tested for haze, transparency (% $T_{vis}$) and refractive index. The compositions tested and the results of the testing are shown in Table 1 below.

TABLE 1

| Sample | PVB-1 (grams) | PVB-2 (grams) | 3GEH (grams) | Plasticizer-1 (grams) | Refractive Index | Tvis (%) | Haze (%) |
|---|---|---|---|---|---|---|---|
| C0 | 50 | 0 | 19 | 0 | 1.477 | 88 | 1.0 |
| C1 | 45 | 5 | 19 | 0 | 1.476 | 77 | 44 |
| C2 | 40 | 10 | 21 | 0 | 1.475 | 75 | 85 |
| C3 | 35 | 15 | 24 | 0 | 1.474 | 80 | 90 |
| C4 | 30 | 20 | 26 | 0 | 1.472 | 81 | 95 |
| C5 | 20 | 30 | 31 | 0 | 1.470 | 82 | 92 |
| D0 | 50 | 0 | 0 | 19 | 1.496 | 88 | 1.0 |
| D1 | 45 | 5 | 0 | 19 | 1.496 | 88 | 1.0 |
| D2 | 40 | 10 | 0 | 21 | 1.496 | 89 | 1.9 |
| D3 | 35 | 15 | 0 | 24 | 1.496 | 88 | 3.1 |
| D4 | 30 | 20 | 0 | 26 | 1.497 | 88 | 3.8 |
| D5 | 20 | 30 | 0 | 31 | 1.497 | 88 | 2.4 |
| D6 | 50 | 0 | 0 | 22 | 1.498 | 89 | 1.1 |
| D7 | 45 | 5 | 0 | 22 | 1.498 | 89 | 1.1 |
| D8 | 40 | 10 | 0 | 22 | 1.497 | 89 | 1.7 |
| D9 | 35 | 15 | 0 | 22 | 1.497 | 89 | 2.3 |
| D10 | 20 | 30 | 0 | 22 | 1.497 | 89 | 2.0 |

Table 1 shows that as two PVB resins are blended at increasingly higher ratios with conventional plasticizer (such as 3GEH), the haze significantly increases and the transparency or % $T_{vis}$ significantly decreases compared to samples having only one PVB resin with conventional plasticizer, or compared to samples having a blend of resins with a high refractive index plasticizer. As shown in Table 1, Conventional Interlayer Sample C0, which comprises only one resin (PVB-1) and conventional plasticizer, has excellent optical properties (very low haze, high % $T_{vis}$). As PVB-2 is added to make a blend of resins in amounts of PVB-2 of 10 to 60% (Samples C1 to C5), the interlayer gets very hazy as the haze level increases significantly. Also, as the amount of PVB-2 in the blend increases, the refractive index of the interlayer decreases.

Examples of the Disclosed Interlayers, D1 to D5 and D7 to D10, show that when blending the two different resins, PVB-1 and PVB-2 at different levels from low to high amounts of PVB-2 in the blend (PVB-1:PVB-2 ratios of 90:10 to 40:60), the transparency or % $T_{vis}$ of the polymer interlayer changes very little or not at all, and the haze increases only slightly with increasing amounts of PVB-2 in the blends. Samples D0 and D6 show that with only one plasticizer, Plasticizer 1 (which is a blend of 3GEH and Benzoflex® 2088 at 10:34 weight ratio and has a refractive index of 1.513 at 25° C.), good interlayers can be made. Also, the refractive index of Samples D0 and D6 are higher than the refractive index of C0. Additionally, as increasing amounts of PVB-2 are added to the blends, there is little to no change in the refractive index of the interlayers of the blends of the two resins.

Additional Samples of both Conventional and Disclosed Interlayers were made according to the methods used to make the Samples in Table 1, with different high refractive index plasticizers and a third resin (PVB-3, which has a lower % PVOH than PVB-2). The Samples were again tested for haze, transparency (% $T_{vis}$), refractive index, as well as for the glass transition temperature(s) ($T_g$) and loss factor (η). The compositions tested are shown in Table 2A, and the results of the testing are shown in Table 2B below.

TABLE 2A

| Sample | PVB-1 (grams) | PVB-2 (grams) | PVB-3 (grams) | 3GEH (grams) | Plasticizer-2 (grams) | Plasticizer-3 (grams) | Plasticizer-4 (grams) |
|---|---|---|---|---|---|---|---|
| C0 | 50 | 0 | | 19 | | | |
| C6 | 30 | 20 | | 26 | | | |
| C7 | 20 | 30 | | 30 | | | |
| C8 | 0 | 50 | | 35 | | | |
| D11 | 0 | 50 | | | 19 | | |
| D12 | 30 | 20 | | | 26 | | |
| D13 | 20 | 30 | | | 30 | | |
| D14 | 30 | | 20 | | | 26 | |
| D15 | 20 | | 30 | | | 30 | |
| D16 | 30 | 20 | | | | | 26 |
| D17 | 20 | 30 | | | | | 30 |

TABLE 2B

| Sample | Refractive Index (RI) | $T_g$-1 (° C.) | $T_g$-2 (° C.) | $T_{vis}$ (%) | Haze (%) | Loss Factor (η) |
|---|---|---|---|---|---|---|
| C0 | 1.477 | N/A | 30 | 88 | 0.9 | 0.02 |
| C6 | 1.473 | −4 | 35 | 81 | 94 | 0.13 |
| C7 | 1.471 | −4 | 35 | 82 | 93 | 0.37 |
| C8 | 1.469 | 0.3 | N/A | 88 | 1.1 | 0.28 |
| D11 | 1.490 | 16 | N.A | 88 | 1 | 0.29 |
| D12 | 1.487 | −4 | 33 | 88 | 12 | 0.15 |
| D13 | 1.487 | −4 | 32 | 88 | 16 | 0.38 |
| D14 | 1.504 | 4 | 32 | 88 | 0.3 | 0.15 |
| D15 | 1.505 | 4 | 27 | 88 | 1.1 | 0.25 |
| D16 | 1.489 | −8 | 30 | 88 | 15 | 0.13 |
| D17 | 1.488 | −7 | 29 | 88 | 18 | 0.35 |

Table 2B again shows that as two PVB resins having different residual % PVOH levels are blended at increasingly higher ratios with conventional plasticizer (such as 3GEH), the haze significantly increases and the transparency or % $T_{vis}$ significantly decreases compared to samples having only one PVB resin with conventional plasticizer, or compared to samples having a blend of resins with a high refractive index plasticizer. As shown in Table 2B, Conventional Interlayer Samples C0 (from Table 1), which comprises only one resin (PVB-1) and conventional plasticizer (3GEH), and C8, which comprises only PVB-2 and 3GEH, have excellent optical properties (very low haze, high % $T_{vis}$). As PVB-2 is added to make a blend of resins in amounts of PVB-2 of 40 and 60% (Samples C7 and C8), the resulting interlayer gets very hazy as the haze increases significantly. Also, as the amount of PVB-2 and 3GEH increases, the refractive index of the interlayer decreases.

Examples of the Disclosed Interlayers, D11 to D17, show that when blending the two different resins having different residual % PVOH content, PVB-1 and PVB-2 or PVB-1 and PVB-3 at levels of 40% or 60% PVB-2 in the blend (PVB-1:PVB-2 or PVB-1:PVB-3 ratios of 60:40 to 40:60), the transparency or % $T_{vis}$ of the polymer interlayer changes very little or not at all, and the haze increases much less than with only the conventional plasticizer as amounts of PVB-2 increase.

Sample D11 shows that with 100% of PVB-2 resin and only one high refractive index plasticizer, Plasticizer 2 (Benzoflex® 131 having a refractive index of 1.490 at 20° C.), a good interlayer can be made. The refractive index of Sample D11 is the same as that of the plasticizer used, and is considerably higher than the refractive index of Sample C8, which comprises only PVB-2 (1.490 vs. 1.469). Additionally, as increasing amounts of PVB-2 or PVB-3 are added to the blends, there is little to no change in the refractive index of the interlayers comprising blends of resins when using the same high refractive index plasticizer.

Comparing pairs of Samples having a blend of two resins and using the same high refractive index plasticizer to pairs of Samples using a different high refractive index plasticizer shows that interlayers having good optical properties can be made. Comparing Samples D12 and D13 to D14 and D15 or D16 and D17 shows that as the refractive index of the plasticizer is changed, the refractive index of the interlayer made from the composition also changes and is close to that of the plasticizer used. Changing the blend of resins and the plasticizer level both have an effect on the resulting haze and transparency, as shown in Table 2B.

Rheological analysis of Samples C0, C6 to C8 and D11 to D17 was performed to determine the glass transition temperature(s) of the interlayers produced. Table 2B shows the presence of two different $T_g$ values for each of the Samples having a blend of two resins. The first $T_g$, at around 6° C. or less, corresponds to the glass transition temperature of plasticized PVB-2, and the second $T_g$, at around 30° C., corresponds to the glass transition temperature of plasticized PVB-1.

Mechanical Impedance Measurement was performed to determine the loss factor of the laminated glass bars produced with the same interlayer samples. Samples having a blend of resins and a high refractive index plasticizer had a loss factor that was at least as good as samples made with a conventional plasticizer and are higher than the Conventional Interlayer Samples C0, which comprises only one resin (PVB-1) and conventional plasticizer, and comparable to C8, which comprises only PVB-2 and 3GEH (conventional monolithic acoustic interlayer). The data in the Tables shows that monolithic polymer interlayers having both good impact and acoustic performance can be produced, while remaining transparent and having low haze.

Additional Samples of both Conventional and Disclosed Interlayers were made according to the methods used to make the Samples in Table 1, with different high refractive index plasticizers and a blend of PVB-1 with either PVB-2 or PVB-3. Samples were made with blends of resins at 40:60 and 60:40 ratios at 3 different plasticizer levels. The Samples were again tested for haze, transparency (% $T_{vis}$), refractive index, as well as for the glass transition temperature(s) ($T_g$) and vibration damping loss factor (η). The compositions tested are shown in Table 3A, and the results of the testing are shown in Table 3B below.

TABLE 3A

| Sample | PVB-1 (grams) | PVB-2 (grams) | 3GEH (grams) | Plasticizer-2 (grams) | Plasticizer-3 (grams) | Plasticizer-4 (grams) |
|---|---|---|---|---|---|---|
| C9 | 30 | 20 | 20 | | | |
| C10 | 30 | 20 | 23 | | | |
| C6 | 30 | 20 | 26 | | | |
| C11 | 20 | 30 | 20 | | | |
| C12 | 20 | 30 | 23 | | | |
| C7 | 20 | 30 | 30 | | | |
| D18 | 30 | 20 | | 20 | | |
| D19 | 30 | 20 | | 23 | | |
| D12 | 30 | 20 | | 26 | | |
| D20 | 20 | 30 | | 20 | | |
| D21 | 20 | 30 | | 23 | | |
| D13 | 20 | 30 | | 30 | | |
| D22 | 30 | 20 | | | 20 | |
| D23 | 30 | 20 | | | 23 | |
| D14 | 30 | 20 | | | 26 | |
| D24 | 20 | 30 | | | 20 | |
| D25 | 20 | 30 | | | 23 | |
| D15 | 20 | 30 | | | 30 | |
| D26 | 30 | 20 | | | | 20 |
| D27 | 30 | 20 | | | | 23 |
| D16 | 30 | 20 | | | | 26 |
| D28 | 20 | 30 | | | | 20 |
| D29 | 20 | 30 | | | | 23 |
| D17 | 20 | 30 | | | | 30 |

TABLE 3B

| Sample | Refractive Index (RI) | $T_g$-1 (° C.) | $T_g$-2 (° C.) | $T_{vis}$ (%) | Haze (%) | Loss Factor (η) |
|---|---|---|---|---|---|---|
| C9 | 1.474 | 3 | 38 | 78 | 94 | 0.11 |
| C10 | 1.474 | 0 | 36 | 80 | 95 | 0.12 |
| C6 | 1.473 | −4 | 35 | 81 | 94 | 0.13 |
| C11 | 1.474 | 9 | 41 | 77 | 94 | 0.18 |
| C12 | 1.473 | 5 | 38 | 79 | 93 | 0.21 |
| C7 | 1.471 | −4 | 35 | 82 | 93 | 0.37 |
| D18 | 1.490 | 4 | 39 | 88 | 12 | 0.1 |
| D19 | 1.489 | 0 | 35 | 88 | 16 | 0.12 |
| D12 | 1.487 | −4 | 33 | 88 | 12 | 0.15 |
| D20 | 1.488 | 10 | 43 | 88 | 15 | 0.19 |
| D21 | 1.489 | 6 | 39 | 88 | 19 | 0.2 |
| D13 | 1.487 | −4 | 32 | 88 | 16 | 0.38 |
| D22 | 1.503 | 12 | 36 | 88 | 0.7 | 0.09 |
| D23 | 1.504 | 9 | 34 | 88 | 0.5 | 0.11 |
| D14 | 1.504 | 4 | 32 | 88 | 1.1 | 0.15 |
| D24 | 1.503 | 16 | 39 | 88 | 1.0 | 0.14 |
| D25 | 1.503 | 14 | 34 | 88 | 1.0 | 0.18 |
| D15 | 1.505 | 4 | 27 | 88 | 1.1 | 0.25 |
| D26 | 1.489 | −1 | 33 | 88 | 13 | 0.12 |
| D27 | 1.489 | −4 | 31 | 88 | 14 | 0.14 |
| D16 | 1.489 | −8 | 30 | 88 | 15 | 0.13 |
| D28 | 1.488 | 6 | 37 | 88 | 14 | 0.22 |
| D29 | 1.488 | 1 | 34 | 88 | 15 | 0.25 |
| D17 | 1.488 | −7 | 29 | 88 | 18 | 0.35 |

As shown in Table 3B, the haze for all of the Conventional Interlayers (C6, C7 and C9 to C12) was very high, and the % $T_{vis}$ was lower than desired. Additionally, the refractive index was lower than that of the Disclosed Interlayers. For the Disclosed Interlayers, the haze and % $T_{vis}$ were much better than the Conventional Interlayers.

In conclusion, the interlayers comprising a blend of two (or more) PVB resins having different residual hydroxyl contents and a high refractive index plasticizer(s) as described herein have advantages over interlayers produced from only a single resin and conventional plasticizer having a lower refractive index or a blend of resins and a conventional plasticizer as previously utilized in the art. In general, use of a higher refractive index plasticizer (either alone or in combination with a conventional plasticizer and/or a second high refractive index plasticizer) results in significantly improved levels of transparency (% $T_{vis}$) and good clarity (i.e., low haze) as well as good acoustic and impact performance, and therefore improved quality monolithic interlayers. Other advantages will be readily apparent to those skilled in the art.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizers in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

The invention claimed is:

1. A polymer interlayer comprising a blend of resins, the blend comprising:
   a first poly(vinyl butyral) resin having a first residual hydroxyl content;
   a second poly(vinyl butyral) resin having a second residual hydroxyl content; and
   a plasticizer;
   wherein the difference between the first residual hydroxyl content and the second residual hydroxyl content is at least 2.0 weight percent; and
   wherein the refractive index of the blend is at least 1.480.

2. The polymer interlayer of claim 1, wherein the first poly(vinyl butyral) resin and the second poly(vinyl butyral) resin are present in a ratio of between about 95:5 and 5:95.

3. The polymer interlayer of claim 1, wherein the polymer interlayer has at least one glass transition temperature ($T_g$) greater than 25° C.

4. The polymer interlayer of claim 1, wherein the plasticizer is a high refractive index plasticizer having a refractive index of at least 1.460.

5. The polymer interlayer of claim 1, wherein the plasticizer is selected from dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), di-(butoxyethyl) terephthalate, di-(butoxyethyoxyethyl) terephthalate, and mixtures thereof.

6. The polymer interlayer of claim 4, further comprising a second plasticizer having a refractive index of less than about 1.450.

7. The polymer interlayer of claim 1, wherein the polymer interlayer has a percent haze of less than 5.0%, as measured by ASTM D1003-61 (Re-approved 1977)-Procedure A using Illuminant C, at an observer angle of 2 degrees.

8. The polymer interlayer of claim 1, wherein the polymer interlayer has at least two different glass transition temperatures ($T_g$) and the difference between the at least two different glass transition temperatures ($T_g$) is at least 5° C.

9. A polymer interlayer comprising a blend of resins, the blend comprising:
   a first poly(vinyl butyral) resin having a first residual hydroxyl content;
   a second poly(vinyl butyral) resin having a second residual hydroxyl content; and
   a plasticizer;
   wherein the difference between the first residual hydroxyl content and the second residual hydroxyl content is at least 2.0 weight percent; and
   wherein the polymer interlayer has a percent haze of less than 5.0%, as measured by ASTM D1003-61 (Re-approved 1977)-Procedure A using Illuminant C, at an observer angle of 2 degrees.

10. The polymer interlayer of claim 9, wherein the first poly(vinyl butyral) resin and the second poly(vinyl butyral) resin are present in a ratio of between about 95:5 and 5:95.

11. The polymer interlayer of claim 9, wherein the polymer interlayer has at least one glass transition temperature ($T_g$) greater than 25° C.

12. The polymer interlayer of claim 9, wherein the plasticizer is a high refractive index plasticizer having a refractive index of at least 1.460.

13. The polymer interlayer of claim 9, wherein the refractive index of the blend is at least 1.480.

14. The polymer interlayer of claim 12, further comprising a second plasticizer having a refractive index of less than about 1.450.

15. The polymer interlayer of claim 9, wherein the polymer interlayer has at least two different glass transition temperatures ($T_g$) and the difference between at least two different glass transition temperatures ($T_g$) is at least 5° C.

16. A polymer interlayer comprising a blend of resins, the blend comprising:
   a first poly(vinyl butyral) resin having a first residual hydroxyl content;
   a second poly(vinyl butyral) resin having a second residual hydroxyl content; and
   a plasticizer having a refractive index of at least 1.460;
   wherein the blend has at least one glass transition temperature ($T_g$) greater than 25° C., and wherein the refractive index of the polymer interlayer is at least 1.480.

17. The polymer interlayer of claim 16, wherein the refractive index of the polymer interlayer is at least 1.485.

18. The polymer interlayer of claim 16, wherein the first poly(vinyl butyral) resin and the second poly(vinyl butyral) resin are present in a ratio of between 95:5 and 5:95.

19. The polymer interlayer of claim 16, further comprising a second plasticizer, wherein the second plasticizer has a refractive index of less than about 1.450.

* * * * *